Dec. 8, 1959 J. V. MLADEK 2,916,617

LINEARLY AND ROTATABLY MOVABLE RECEIVER CONTROL MECHANISM

Filed Feb. 25, 1957

INVENTOR

John V. Mladek

BY Peck & Peck

ATTORNEYS

United States Patent Office 2,916,617

Patented Dec. 8, 1959

2,916,617

LINEARLY AND ROTATABLY MOVABLE RECEIVER CONTROL MECHANISM

John Victor Mladek, Washington, D.C.

Application February 25, 1957, Serial No. 642,138

5 Claims. (Cl. 250—20)

This invention relates broadly to control mechanism and in its more specific aspects it relates to such mechanism which is adapted to control the operation of electronic apparatus of various types; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

In conventional electronic apparatus, such as radio and television receivers, it is customary to provide at least two, and often more, control knobs which are usually spaced apart along the control panel of the housing or cabinet in which the apparatus is housed. For instance, one control knob may be operable to turn on the receiving apparatus and to control the audio volume while the other control knob may be operable to tune the receiver to receive signals from different channels or transmitting stations.

The operation of the plurality of spaced apart controls as are now generally provided on electronic receivers is not as quick and easy as could be desired. It will be apparent that for simultaneous tuning and volume control both hands of the operator must be used and if only one hand is used simultaneous tuning and volume control is not possible. Since it is customary to space the control knobs across the control panel one hand may first adjust one knob and then the other and this will be the case even though the control knobs may be positioned closely adjacent to one another. It will be appreciated that the operator of an electronic receiving set, such as a radio or television, may wish to operate the set when one of his hands is in use and not readily available for the adjusting operation in which case he must follow the slow tedious and irritating procedure outlined above.

The custom is growing of providing shelves, cabinets and the like areas in homes for housing radios and often television sets in more or less out of the way areas. This trend has, in many instances, added to the difficulties of controlling the tuning and volume for one or more of the plurality of knobs may be positioned so that it is difficult of access to the person desiring to operate the set by the adjustment of the control knobs. Where the set may be housed in a more or less out of the way area the time and difficulty of adjusting several knobs at different locations on the control panel will be recognized.

I have provided a control mechanism for electronic equipment which overcomes the aforementioned and other objections inherent in control mechanism now generally in use in electronic equipment.

Instead of requiring the usual two or more spaced control knobs on the control panel I have evolved a single control point on the control panel where the set may be turned on, the volume varied and the set tuned and in accomplishing this highly advantageous result I combine two movements in the single control knob. While I shall describe my mechanism as controlling activation of the set, tuning and volume it is to be understood that my novel mechanism may be used for controlling other phases of such electronic apparatus and still fall within the spirit and scope of my invention.

The positioning of the control means for activating the receiver, controlling volume and tuning at one point and with one knob which involves a linear and a rotary movement constitutes a novel concept and permits complete and easy control of the receiver at one point and with only one hand of the operator. Not only does my mechanism make one hand operation simple and completely feasible but it also enhances the versatility of the control mechanism in allowing simultaneous one handed control of activation of the receiver, tuning and volume control.

The single control means which I have devised also adds to the accessibility of the adjustment means of the electronic receiver which in many instances represents a substantial advantage.

The control mechanism is preferably though not necessarily formed as a unit for mounting within the cabinet to thereby facilitate its removal for replacement or repair.

It has been one of my purposes to provide a control mechanism of this type which is easy to operate and has few working parts to get out of order.

The control mechanism which I have devised is economical to produce and sturdy of construction and under normal use conditions will operate efficiently during the normal life of the electronic receiver with which it is combined.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
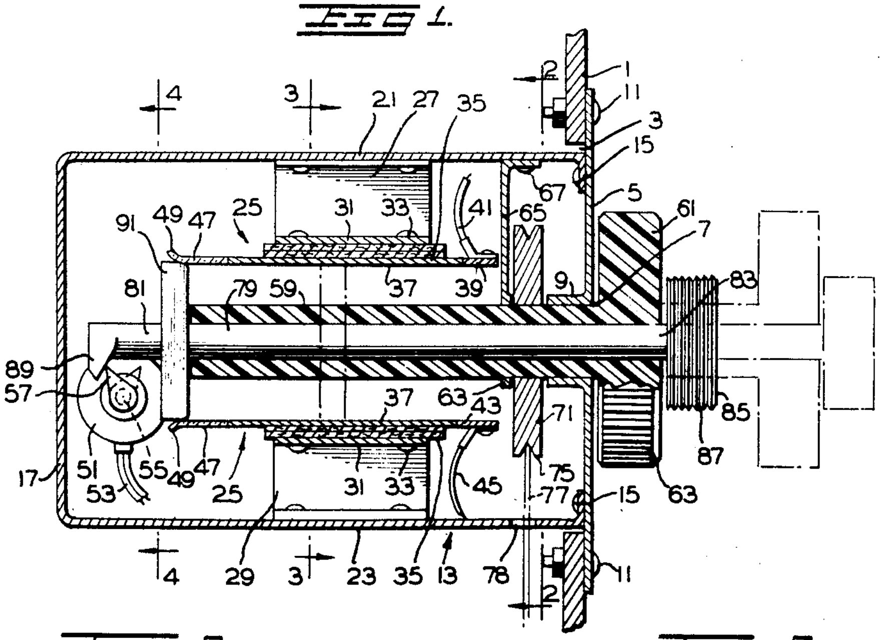
Fig. 1 is a vertical sectional of a control mechanism unit mounted in operative position within an electronic receiver cabinet.
Figure 2:
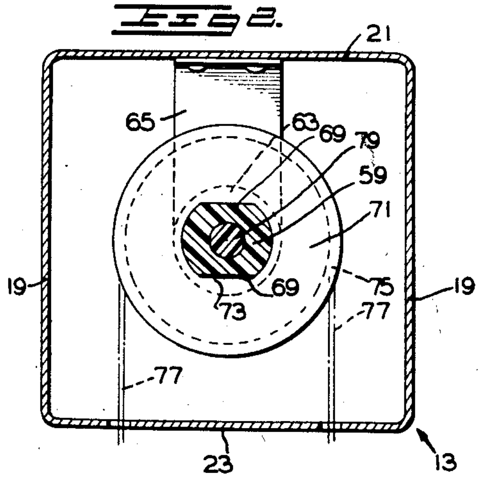
Fig. 2 is a view taken on line 2—2 of Fig. 1.
Figure 3:
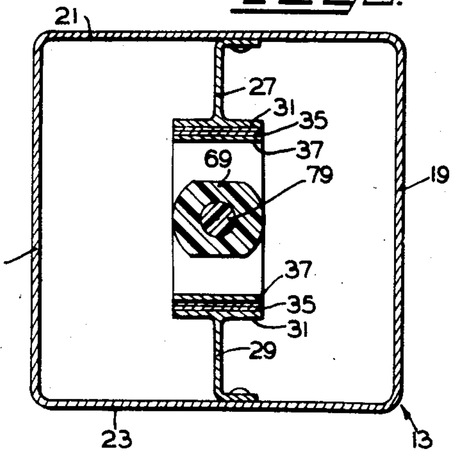
Fig. 3 is a view taken on line 3—3 of Fig. 1.
Figure 4:
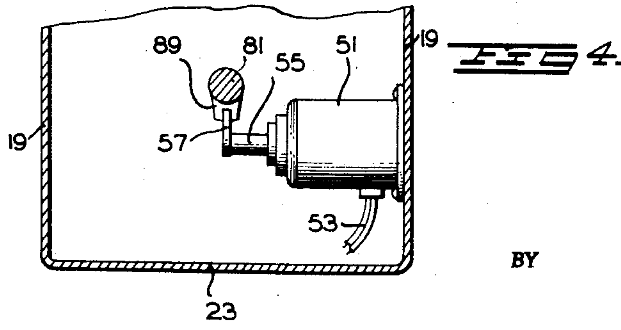
Fig. 4 is a view taken on line 4—4 of Fig. 1.

In the accompanying drawing I have used the numeral 1 to designate the front wall of an electronic receiver cabinet such as a radio or television. The front wall of the cabinet is provided with an opening 3 therein which is dimensionally ample to receive and mount therein the unit which provides the control mechanism about to be described. The opening 3 is formed at any suitable and convenient location on the front wall of the cabinet so that the control knobs of my mechanism which project through the opening will be fully and conveniently accessible to the user of the electronic receiver. The opening 3 is closed by a plate 5 which is preferably imperforate except at the center thereof where I provide an aperture 7 of annular configuration. I form an inwardly extending nipple 9 which extends from the periphery of the aperture 7. The closure plate 5 may be removably fastened to the front wall 1 by any suitable means such as screws 11.

A casing designated generally by the numeral 13 is mounted as at 15 to the inner side of closure plate 5, the casing is open at its front and may be provided with a rear wall 17, side walls 19 and top and bottom walls 21 and 23, respectively. Consideration of Fig. 1 of the drawings indicates that when the plate 5 with the casing attached thereto is mounted on the front wall 1 the casing will be positioned within the cabinet of the electronic receiver.

In Fig. 1 of the drawings I have schematically illustrated a pair of resistors, rheostats, potentiometers or any suitable and conventional means for regulating currents in order to control the audio volume of the electronic receiver. Such resistors or the like devices I have designated in their entirety by the numeral 25. As one example from among many mounting arrangements for such resistors I may fix a depending bracket 27 to the top wall 21 of the casing and an upstanding bracket 29 to the bottom wall 23 of the casing, the two brackets being aligned and their projected flat plates 31 being spaced apart. Fixed to the outer surface of each plate 31 in any suitable manner, such as by rivets 33, is an insulating means 35 and fixed in any convenient manner to the outer face of such insulation on each bracket is an elongated band-like resistor 37 of any suitable and desirable type, providing any suitable variable resistance means whereby the current flow may be regulated for volume control of the receiving apparatus. At one end the resistor 37 which is mounted on the bracket 27 is provided with a connector 39 to which a lead 41 is connected which lead is connected to the usual loud-speaker (not shown), while the resistor 37 which is mounted on the bracket 29 is provided at one end with a connector 43 to which a lead 45 is connected which lead is connected with the power supply for the electric circuit of the apparatus. It will of course be understood that holes are provided in casing 13 through which leads 41 and 45 may pass for connection into the circuit of the apparatus. At the end of each resistor opposite to the ends on which the connectors 39 and 43 are formed I provide an insulated extension 47, the free end of each such extension being bent outwardly as at 49. It is within my contemplation to form one of the plates as a resistor and the other as a connector.

I mount any conventional type of rotary switch 51 on a side wall 19 of the housing, the switch having an electric lead 53 connected therewith for connection into the electric circuit for connecting and disconnecting the circuit into the power supply. A rotary switch operating spindle 55 extends from the switch 51 and on the outer end of the spindle is fixed an operating nose or element 57 which extends radially from the end of the spindle so that the spindle will be rotated to operate the switch when the operating nose is engaged and rotated. It will be appreciated that operation of the switch by means of the spindle and the nose will either energize the circuit in the receiving apparatus or de-energize it to thereby either turn the receiver on or turn it off.

The apparatus which I have devised for operating the switch 51 and for varying the volume of the audio of the receiving apparatus comprises what I shall term a tuning sleeve 59 which is formed of plastic, rubber or any other desirable dieletric material, and is preferably of generally cylindrical configuration. The tuning sleeve 59 is provided with an operating knob 61 on one end thereof, the operating knob being positioned exteriorly of the cabinet of the electronic receiver and is preferably formed with transverse ribs 63 thereon. The tuning sleeve extends from the operating knob 61 through and journalled in the nipple 9 and into the housing 13 and through an annulus 63 formed on the lower end of a bracket 65 which is fixed as at 67 to the upper wall 21 of the housing to depend therefrom. For a purpose to be hereinafter explained the tuning sleeve 59 is formed with diametrically opposed flats 69 thereon. The sleeve 59 passes through the nipple and the annulus with a relatively loose fit in such manner that it is rotatively mounted in operative position and also longitudinally slidably mounted in such position. Thus, the sleeve may be rotated by grasping the operating knob and rotating it and it may also be moved in a linear direction by grasping the knob and either pulling or pushing it. I mount a tuning pulley 71 on the tuning sleeve in position thereon between the inner end of the nipple 9 and the annulus 63. The central bore of the tuning pulley is provided with flats 73 corresponding and mating with the flats 69 which are provided on the tuning sleeve 59. The peripheral surface of the tuning pulley is grooved as at 75 and receives in the groove a cord or cable 77 which extends from the pulley to a usual variable condenser for the operation thereof to tune the apparatus when the pulley is rotated. It will be evident that the pulley is mounted on the sleeve for rotation therewith but is restrained from linear movement with the sleeve by the annulus 63 and the inner end of the nipple 9. Holes 78 are formed in the casing through which cord 77 passes.

Mounted within the bore of the tuning sleeve is what I shall term a volume control rod 79 which is formed of any suitable material and is of greater length than the tuning sleeve so that it extends outwardly beyond the inner end thereof as at 81 and also extends through a bore provided in the operating knob 61 and beyond said knob as at 83. I provide an operating knob 85 on the outer end of the rod 79 which knob is preferably provided with a plurality of circumferentially extending ribs 87, the knob being formed of plastic, rubber or any other suitable dielectric material. Depending from the inner end of the volume control rod 79 is a finger or nose 89 which is in line with the switch operating nose 57 so that upon linear outward movement of the rod and the finger the switch will be engaged and thrown to connect the electric circuit of the apparatus into the power supply line, and upon linear inward movement the nose will be rotated to close the switch. Any suitable dial or graduated scale arrangement may be provided to aid in tuning the receiver.

I fix a wiper element 91 on the inner end of the extension 81 of the volume control rod 79, the wiper being formed of electrical conductive material and preferably though not necessarily of rectangular configuration and of a height substantially the same as the distance between the resistors 37. As will be apparent from consideration of the drawings the wiper when in operative position extends between and in electrical contact with the resistors and when in inoperative position as illustrated in Fig. 1 of the drawings the wiper is between and in contact with the insulated ends 47 which are provided on the resistors.

With the control mechanism in the inoperative or off position disclosed in Fig. 1 of the drawings the electronic receiver controlled thereby may be set into operation by grasping the knob 61 and pulling outwardly thereon which produces an outward linear movement in the sleeve 59 and since the knob 61 abuts the knob 85, it will cause rod 79 to slide outwardly. Such linear movement of the rod 79 will cause the finger 89 to engage and rotate nose 57 to thereby rotate spindle 55 to throw the switch and energize the electric circuit of the apparatus. Further outward movement of the rod 79 will move the wiper 91 into position between and in engagement with the resistors 37 to control the volume of the audio of the apparatus and further outward movement of the rod 79 to move the wiper further along the resistors will, of course, increase the volume of the sound. The apparatus may be tuned by rotating knob 61 and the tuning sleeve 59 until the desired station is located and properly tuned in. The tuning will be achieved at any volume desired and the volume can be modified in the process of tuning. It will be appreciated that rotation of the sleeve will cause rotation of the pulley and movement of the cord 77 to operate the variable condenser. The volume control rod will be restrained at all times from rotation because of the positioning of the rectangular wiper between either the resistors or the insulated ends 47. Thus, there is no chance of the finger being rotated out of line with the nose 57 on the switch shaft.

The control mechanism allows subsequent modification of volume without dislocating the station tuned in by grasping knob 85 and pulling it outwards or pushing it inwards. The volume can be adjusted without effecting the operative position of knob 61 and the tuning sleeve 59.

While I have illustrated my control mechanism as being mounted within a housing to form a unit therewith it is to be distinctly understood that the control mechanism may be mounted in and combined with an electronic receiver in any other desirable manner and still fall within the spirit and scope of my invention.

It will now be recognized that I have provided a mechanism for controlling the energization, the volume and the tuning of an electronic receiver which may be operated at one location on the cabinet in which the apparatus is housed and by means of a single knob.

I claim:

1. Control means for an electronic receiver including, in combination, a pair of spaced apart resistors for controlling the audio volume of the receiver, a tuning mechanism and a rotatable tuning control sleeve extended between and spaced from said resistors, said tuning mechanism including a pulley mounted on said sleeve for rotation therewith, a linearly movable member mounted within the bore of said sleeve and extending beyond each end thereof, a wiper element fixed on an extended end of said linearly movable member for linear movement therewith between and in sliding engagement with said resistors to vary the volume of the receiver, means causing linear movement of said rotary sleeve when said linearly movable member is moved, further means preventing said pulley from linear movement with said sleeve when it is linearly moved and said wiper element preventing rotary movement of said linearly movable member, a control knob on the other extended end of said linearly movable member and a control knob on the end of said sleeve adjacent said first named control knob.

2. Control means for regulating the mechanism governing operation of an electronic receiver, including an elongated manually rotatable member connected to a mechanism for the operation thereof and an elongated linearly movable member connected to further of said mechanisms for the operation thereof, one of said members being provided with an axial bore and the other of said members being mounted within said bore for their operation from a single control location, and said rotatable member being linearly movable with said linearly movable member and said linearly movable member is prevented from rotation with said rotatable member and means for preventing rotation of said linearly movable member.

3. Control means for regulating the mechanisms governing operation of an electronic receiver, including a manually rotatable and linearly movable member having an axial bore therein and operable for controlling the operation of a mechanism and a member movable solely in a linear direction mounted within said bore and operable for controlling the operation of further of said mechanisms, and means connected with said members for causing rotation of said first named member and linear movement of said second named member, and further means on said second named member for preventing the rotation thereof.

4. Control means for an electronic receiver including, in combination, an audio volume control element and tuning mechanism and a rotatable tuning mechanism control sleeve connected with said tuning mechanism for the operation thereof when said sleeve is rotated, a linearly movable member mounted within the bore of said sleeve and extending beyond each end of the sleeve, said rotatable sleeve being linearly movable with said linearly movable member and said linearly movable member being prevented from rotation with said rotary sleeve, means on said linearly movable member for preventing its rotation and a wiper element fixed on one extending end of said linearly movable member for linear movement therewith in sliding contact with said audio volume control element to vary the volume of the receiver, a control knob on the other end of said linearly movable element and a control knob on the end of said sleeve adjacent said first named control knob.

5. Control means for an electronic receiver including, in combination, an audio volume control element and tuning mechanism and a rotatable tuning mechanism control sleeve connected with said tuning mechanism for the operation thereof when said sleeve is rotated, a linearly movable member mounted within the bore of said sleeve and extending beyond each end of the sleeve, a wiper element fixed on one extending end of said linearly movable member for linear movement therewith in sliding contact with said audio volume control element to vary the volume of the receiver, a control knob on the other end of said linearly movable element and a control knob on the end of said sleeve adjacent said first named control knob, said wiper element being engageable with one end of said sleeve and said first named control knob being engageable with said other knob to cause linear movement in said rotary sleeve when said linearly movable member is actuated.

References Cited in the file of this patent

UNITED STATES PATENTS

| | | |
|---|---|---|
| 1,905,539 | White | Apr. 25, 1933 |
| 2,166,532 | Naden | July 18, 1939 |
| 2,214,659 | Dardess | Sept. 10, 1940 |

FOREIGN PATENTS

| | | |
|---|---|---|
| 166,982 | Switzerland | Jan. 31, 1934 |